United States Patent
Hoshi et al.

(10) Patent No.: US 10,538,689 B2
(45) Date of Patent: Jan. 21, 2020

(54) ADHESIVE COMPOSITION AND ADHESIVE SHEET USING THE SAME

(71) Applicant: DAI NIPPON PRINTING CO., LTD., Tokyo-To (JP)

(72) Inventors: Kentaro Hoshi, Tokyo-To (JP); Yuto Enomoto, Tokyo-To (JP)

(73) Assignee: DAI NIPPON PRINTING CO., LTD., Tokyo (JP)

(*) Notice: Subject to any disclaimer, the term of this patent is extended or adjusted under 35 U.S.C. 154(b) by 327 days.

(21) Appl. No.: 15/115,413

(22) PCT Filed: Jan. 16, 2015

(86) PCT No.: PCT/JP2015/051122
§ 371 (c)(1),
(2) Date: Sep. 26, 2016

(87) PCT Pub. No.: WO2015/115212
PCT Pub. Date: Aug. 6, 2015

(65) Prior Publication Data
US 2017/0158924 A1 Jun. 8, 2017

(30) Foreign Application Priority Data
Jan. 29, 2014 (JP) .................. 2014-014636

(51) Int. Cl.
| | | |
|---|---|---|
| C09J 163/00 | (2006.01) | |
| B32B 37/06 | (2006.01) | |
| B32B 37/12 | (2006.01) | |
| B32B 38/10 | (2006.01) | |

(52) U.S. Cl.
CPC ............ *C09J 163/00* (2013.01); *B32B 37/06* (2013.01); *B32B 37/12* (2013.01); *B32B 38/10* (2013.01); *B32B 2305/72* (2013.01); *C09J 2400/286* (2013.01); *C09J 2433/00* (2013.01); *C09J 2463/00* (2013.01); *C09J 2483/00* (2013.01)

(58) Field of Classification Search
CPC ...................................... C08G 59/38
See application file for complete search history.

(56) References Cited

U.S. PATENT DOCUMENTS

| | | | | |
|---|---|---|---|---|
| 2002/0082322 A1* | 6/2002 | Hwang | ............... | C08K 5/5399 |
| | | | | 524/86 |
| 2009/0068596 A1* | 3/2009 | Yang | ........................ | C08F 2/48 |
| | | | | 430/296 |
| 2009/0198012 A1* | 8/2009 | Sakata | ...................... | C08J 5/24 |
| | | | | 524/606 |
| 2011/0253943 A1 | 10/2011 | Liang et al. | | |
| 2015/0240113 A1* | 8/2015 | Pratt | ..................... | C09D 5/033 |
| | | | | 428/327 |
| 2017/0327719 A1* | 11/2017 | Hoshi | ..................... | C09J 11/06 |

FOREIGN PATENT DOCUMENTS

| | | | |
|---|---|---|---|
| EP | 2522704 A1 | 11/2012 | |
| JP | H01-215818 A | 8/1989 | |
| JP | H05-112631 A | 5/1993 | |
| JP | 2003-082034 A | 3/2003 | |
| JP | 2003-277591 A | 10/2003 | |
| JP | 2007-332314 A | 12/2007 | |
| JP | 2013-006974 A | 1/2013 | |
| WO | 2010/035859 A1 | 4/2010 | |
| WO | 2014/103040 A1 | 7/2014 | |
| WO | WO 2016/084960 | * | 6/2016 |

OTHER PUBLICATIONS

Mar. 17, 2015 International Search Report issued in International Patent Application No. PCT/JP2015/051122.
Aug. 2, 2016 International Preliminary Report on Patentability issued in International Patent Application No. PCT/JP2015/051122.
Aug. 31, 2017 Search Report issued in European Patent Application No. 15743516.5.

* cited by examiner

*Primary Examiner* — Jeffrey C Mullis
(74) *Attorney, Agent, or Firm* — Oliff PLC

(57) ABSTRACT

An adhesive composition that enables adhesion between metals, between a metal and an organic material, and between an organic material and an organic material, have at the same time an excellent storage stability, and are capable of maintaining an excellent adhesive strength even in a high temperature hydrothermal environment, is provided. The adhesive composition according to the present invention comprises an epoxy resin, an epoxy modified silicone resin, an acrylic resin, and a curing agent, the above-mentioned epoxy resin comprising a bisphenol bifunctional epoxy resin and an epoxy resin with trifunctionality or higher functionality, and the above acrylic resin comprising a binary copolymer of methyl methacrylate-butyl acrylate-methyl methacrylate or a modified product thereof.

12 Claims, 8 Drawing Sheets

SEM photograph of the adhesive from Example 1

SEM photograph of the adhesive from Example 2

SEM photograph of the adhesive from Comparative Example 1

ADHESIVE COMPOSITION AND ADHESIVE SHEET USING THE SAME

BACKGROUND OF THE INVENTION

Technical Field

The present invention relates to adhesive compositions; and more specifically, an adhesive composition that enables adhesion between metals, between a metal and an organic material, and between an organic material and an organic material, have an excellent storage stability, and are capable of maintaining an excellent adhesive strength even in a high temperature hydrothermal environment; and adhesive sheets using the adhesive composition.

Background Art

Examples of conventional bonding methods for joining two adherends include interlocking, welding, and adhesion using an adhesive or a sticker, and these methods are frequently used in their fields depending on their uses. In recent years, in uses related to transporters such as automobiles, weight saving of the automobile body has advanced, and hybrid vehicles and electric vehicles are becoming popular as solutions to global warming by, for example, reduction of emission of the carbon dioxide gas $CO_2$. Accordingly, aluminum, magnesium, and FRPs (CFRP: Carbon Fiber Reinforced Plastics, GFRP: Glass Fiber Reinforced Plastics) are becoming more frequently used for the automobile body because of their light weights.

In conventional welding processes, welding of different kinds of materials such as aluminum and iron is very difficult, and melding itself is impossible in cases of FRPs of glass fibers and carbon fibers. Thus, a method for bonding these materials (adherends) with a bonding strength equivalent to that achieved by welding is required. As a method for bonding materials which cannot be bonded by welding or the like, a method using an adhesive may be employed. Adhesives used for bonding such materials are required, for example, to be capable of achieving adhesion between metals, between a metal and an organic material, and between an organic material and an organic material, to achieve a bonding strength sufficient for structural uses, and to provide adhesion whose strength is not deteriorated by temperature changes.

As adhesives that satisfy the above requirements, thermo-setting resins such as epoxy resins are generally used. However, although the mechanical strength of the resin itself of an epoxy adhesive after curing is high, the resin has poor toughness, and, in cases where an epoxy adhesive is used for a use such as an aircraft or an automobile, the problem of a decrease in the bonding strength sometimes occurs due to brittle fracture. In order to solve such a problem, addition of a thermo-setting resin or the like to an epoxy resin is attempted to provide an epoxy adhesive having flexibility (e.g., JP 2003-82034 A).

PRIOR ART REFERENCE

Patent Document

Patent Document 1: JP 2003-82034 A

SUMMARY OF THE INVENTION

Problems to be Solved by the Invention

However, in cases where a thermoplastic resin having flexibility as suggested in JP 2003-82034 A is added to epoxy adhesive, adhesive's heat resistance and water resistance are impaired and thus the use of the adhesive is limited in a high temperature environment or is not feasible in applications in which water resistance is required, which has been problematic.

The present inventors have discovered that by using two kinds of particular epoxy resins and in addition adding an epoxy modified silicone resin and a particular acrylic resin to such epoxy resins, an adhesive composition can be provided, which adhesive composition exhibits an excellent storage stability and is capable of maintaining an excellent adhesive strength even in a high temperature hydrothermal environment. The present invention is based on such findings.

Therefore, an object of the present invention is to provide adhesive compositions capable of adhering metal to metal, metal to an organic material, and an organic material to an organic material, having at the same time an excellent storage stability, and maintaining an excellent adhesive strength even in a high temperature hydrothermal environment.

Further, another object of the present invention is to provide adhesive sheets using the adhesive composition described above.

Means for Solving the Problems

The adhesive composition according to the present invention comprises an epoxy resin, an epoxy modified silicone resin, an acrylic resin, and a curing agent, the epoxy resin comprising a bisphenol bifunctional epoxy resin and an epoxy resin with trifunctionality or higher functionality, and the acrylic resin comprising a binary copolymer of methyl methacrylate-butyl acrylate-methyl methacrylate or a modified product thereof.

Further, according to an aspect of the present invention, the bisphenol bifunctional epoxy resin may comprise two bisphenol type epoxy resins: a bisphenol type epoxy resin which is in a liquid state at normal temperature and a bisphenol type epoxy resin whose glass transition temperature is within the range of 50 to 150° C. and which is in a solid state at normal temperature.

Further, according to an aspect of the present invention, the epoxy resin with trifunctionality or higher functionality may be a tetrafunctional epoxy resin with a bis(aminophenyl)methane backbone.

Further, according to an aspect of the present invention, the adhesive composition may further comprise a silane coupling agent.

Further, according to an aspect of the present invention, the curing agent may be a dicyandiamide-based curing agent.

Further, according to an aspect of the present invention, the curing agent may contain a dicyanamide-based curing agent and a cyanate-based curing agent.

Further, according to an aspect of the present invention, the bisphenol bifunctional epoxy resin and the epoxy resin with trifunctionality or higher functionality may be contained at a ratio of 75:65 to 115:65 by mass.

Further, according to an aspect of the present invention, 58.3 to 86.5 parts by mass of the epoxy resin, 8.3 to 28.8 parts by mass of the epoxy modified silicone resin, and 3.9 to 16.6 parts by mass of the acrylic resin may be contained.

Further, the adhesive sheet according to another aspect of the present invention comprises a first release paper, an adhesive layer, and a second release paper, which are laminated in this order, which the adhesive layer comprises the adhesive composition described above.

Further, according to an aspect of the present invention, the adhesive layer further comprises a core material and the above adhesive may be impregnated into the core material.

Further, another aspect of the adhesion method according to the present invention is a method of adhering a first adherend to a second adherend using the adhesive sheet, the method comprises:

peeling off and removing the first release paper and the second release paper from the adhesive sheet to expose the adhesive layer;

placing the adhesive layer between the first adherend and the second adherend to temporarily fix the first adherend to the second adherend; and curing the adhesive layer by heating to adhere the first adherend to the second adherend.

Further, according to the present invention, a laminated product obtained by the adhesion method is provided as well.

Effect of the Invention

According to the present invention, since two kinds of specific epoxy resins are used and in addition an epoxy modified silicone resin and a specific acrylic resin are added to such epoxy resins in the adhesive composition, the adhesive composition exhibits excellent storage stability and is capable of maintaining excellent adhesive strength even in a high temperature hydrothermal environment.

DETAILED DESCRIPTION OF THE INVENTION

Figure 1:
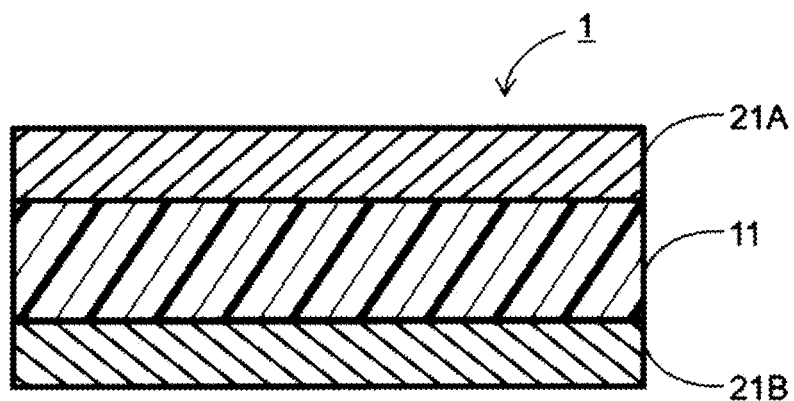
FIG. 1 is a cross-section schematic view of one embodiment of the adhesive sheet according to the present invention.

The adhesive composition according to the present invention contains an epoxy resin, an epoxy modified silicone resin, an acrylic resin, and a curing agent as essential components. Each of the components composed of the adhesive composition will be described below.

<Epoxy Resin>

The epoxy resin used in the adhesive composition according to the present invention contains a bisphenol bifunctional epoxy resin and an epoxy resin with trifunctionality or higher functionality. By containing a rigid epoxy resin having a bisphenol backbone and the polyfunctional epoxy resin, the heat resistance of the adhesive composition after curing can be improved.

As the bisphenol bifunctional epoxy resin, a known bisphenol epoxy resin such as a bisphenol A epoxy resin or a bisphenol F epoxy resin can be used; and a bisphenol A epoxy resin is preferred.

The above bisphenol A epoxy resin are divided into ones that are liquid at normal temperature and ones that are solid at normal temperature depending on the number of repeating units in a bisphenol backbone. Bisphenol A epoxy resins having 0 or 1 main chain are liquid at normal temperature whereas bisphenol A epoxy resins having 2 to 10 main chains are solid at normal temperature. These bisphenol A epoxy resins with relatively low molecular weight exhibit high crystallinity; and when temperature is the melting point or higher, even the ones that have undergone crystallization to be solid at normal temperature rapidly melt and transform to a liquid form with a low viscosity. Therefore, in the step of bonding to the adherend, heating allows the adhesive to closely contact with the adherend to be solidified; and the adhesive solidly adheres to the adherend, which thus enables the adhesive strength to be improved. In addition, because those bisphenol A epoxy resins with relatively low molecular weight have a higher cross-linking density, the resins also have properties of a high mechanical strength, a good chemical resistance, a high curability, and a low hygroscopicity (attributed to a smaller free volume).

In the present invention, it is preferred to use, as the bisphenol A epoxy resin, the aforementioned bisphenol A epoxy resin that is solid at normal temperature and bisphenol A epoxy resin that is liquid at normal temperature in combination. The combined use of the one that is solid at normal temperature and the one is liquid at normal temperature is able to improve the flexibility and film-forming properties while maintaining the mechanical strength; and therefore an adhesive sheet with an excellent flexibility and excellent film-forming properties can be obtained while the resin (adhesive composition) maintains its intrinsic mechanical strength. As a result, the bond strength between adherends can be improved. As the bisphenol A epoxy resin that is solid at normal temperature, preferred is one that has a glass transition temperature ranging from 50 to 150° C. from the viewpoint of mechanical strength, heat resistance, and film-forming properties. Specifically, examples of the bisphenol A epoxy resin having 0 or 1 main chain that is liquid at normal temperature include JER828 manufactured by Japan Epoxy Resins Co., Ltd.; and examples of the bisphenol A epoxy resin having 2 to 10 main chains that is solid at normal temperature include JER1001 manufactured by Japan Epoxy Resins Co., Ltd.

Although it depends on the application the adhesive is used, a mix ratio of the bisphenol A epoxy resin that is solid at normal temperature to the bisphenol A epoxy resin that is liquid at normal temperature preferably falls in a ratio by mass of 1:100 to 100:1. By setting the mix ratio of both in the above range, an adhesive can have a more excellent adhesive strength.

Examples of the epoxy resin with trifunctionality or higher functionality include epoxy resins having a tris(hydroxyphenyl)methane structure, epoxy resins having a tetrakis(hydroxyphenyl)ethane structure, epoxy resins having an aminophenol structure, and epoxy resins having a bis(aminophenyl)methane structure. Of these, epoxy resins having a bis(aminophenyl)methane structure are preferred. One example of the epoxy resin having a bis(aminophenyl) methane structure includes N,N,N',N'-tetraglycidyl diaminodiphenylmethane. It is to be noted that a glycidylamine group and a glycidylether group are available as the epoxy group; and an epoxy resin having three or more glycidylether groups is preferred from the viewpoint of the storage stability of the adhesive composition. By containing such an epoxy resin with trifunctionality or higher functionality, the epoxy resin forms a cross-linked structure to improve the heat resistance of the adhesive in a high temperature hot water environment. In addition, the cross-linking formation leads to self-assembly with the epoxy resin as a matrix, resulting in local formation of a sea-island structure. It is believed that such a sea-island structure is able to impart toughness to the adhesive after curing.

As the above epoxy resin with trifunctionality or higher functionality, ones that are commercially available may be used; and examples thereof include jER1032H60 manufactured by Mitsubishi Chemical Corporation (an epoxy resin having a tris(hydroxyphenyl)methane structure), jER1031S manufactured by Mitsubishi Chemical Corporation (an epoxy resin having a tetrakis(hydroxyphenyl)ethane structure), EHPE3150 manufactured by Daicel Corporation (an epoxy resin having an oxiranylcyclohexane structure), jER630 manufactured by Mitsubishi Chemical Corporation (an epoxy resin having an aminophenol structure), and jER604 manufactured by Mitsubishi Chemical Corporation (an epoxy resin having a bis(aminophenyl)methane structure). The above epoxy resin with trifunctionality or higher functionality may be solely used; or two or more kinds thereof may be as appropriate used in combination.

A mix ratio of the above bisphenol bifunctional epoxy resin to the above epoxy resin with trifunctionality or higher functionality is preferably 1:1 to 3:1 by mass and more preferably a range of 75:65 to 115:65. By mixing the bisphenol bifunctional epoxy resin with the epoxy resin with trifunctionality or higher functionality in the above range, the adhesive strength at normal temperature further improves and the adhesive strength in a high temperature hydrothermal environment also improves.

The content of the epoxy resin including the above bisphenol bifunctional epoxy resin and the above epoxy resin with trifunctionality or higher functionality is preferably in a range of 40 to 90 parts by mass based on the total amount of the resin components (that is, the epoxy resin, the epoxy modified silicone resin, and the acrylic resin) in the adhesive composition and in particular preferably in a range of 58.3 to 86.5 parts by mass.

<Epoxy Modified Silicone Resin>

The epoxy modified silicone resin used in the present invention refers to one obtained by introducing an epoxy group into part of a silicone resin. The silicone resin is a compound having a polyorganosiloxane backbone and usually a compound in which the main backbone (the main chain) part is primarily composed of repeated organosiloxane units and comprises at least one silanol group; and the epoxy modified silicone resin can be obtained by an addition reaction of this silanol group with an epoxy compound. As long as the main backbone of the silicone resin has at least one silanol group, a silicone resin having a branched structure may also be used.

Examples of the above epoxy modified silicone resin include γ-glycidoxypropyl trimethoxysilane, γ-glycidoxypropyl triethoxysilane, 2-(3,4-epoxycyclohexyl)ethyltrimethoxysilane, 2-(3,4-epoxycyclohexyl)ethyltriethoxysilane, (γ-glycidoxypropyl)(methyl)dimethoxysilane, (γ-glycidoxypropyl)(ethyl)dimethoxysilane, (γ-glycidoxypropyl)(methyl)diethoxysilane, (γ-glycidoxypropyl)(ethyl)diethoxysilane, [2-(3,4-epoxycyclohexyl)ethyl](methyl)dimethoxysilane, [2-(3,4-epoxycyclohexyl)ethyl](ethyl)dimethoxysilane, [2-(3,4-epoxycyclohexyl)ethyl](methyl)diethoxysilane, [2-(3,4-epoxycyclohexyl)ethyl](ethyl)diethoxysilane, (γ-glycidoxypropyl)(methoxy)dimethylsilane, (γ-glycidoxypropyl)(methoxy)diethylsilane, (γ-glycidoxypropyl)(ethoxy)dimethylsilane, (γ-glycidoxypropyl)(ethoxy)diethylsilane, [2-(3,4-epoxycyclohexyl)ethyl](methoxy)dimethylsilane, [2-(3,4-epoxycyclohexyl)ethyl](methoxy)diethylsilane, [2-(3,4-epoxycyclohexyl)ethyl](ethoxy)dimethylsilane, [2-(3,4-epoxycyclohexyl)ethyl](ethoxy)diethylsilane, and a partial condensate thereof. The above epoxy modified silicone resin may be solely used; or two or more kinds thereof may be as appropriate used in combination.

As the above epoxy modified silicone resin, ones that are commercially available may be used; and examples thereof can include ES1001N, ES1002T, and ES1023 (all of which are manufactured by Shin-Etsu Silicones); and a methyl silicate, MSEP2 (manufactured by Mitsubishi Chemical Corporation).

The content of epoxy modified silicone resin is preferably in a range of 5 to 40 parts by mass based on the total amount of the resin components (that is, the epoxy resin, the epoxy modified silicone resin, and the acrylic resin) in the adhesive composition and in particular preferably in a range of 8.3 to 28.8 parts by mass.

<Acrylic Resin>

As the acrylic resin contained in the adhesive composition according to the present invention, a binary copolymer of methyl methacrylate-butyl acrylate-methyl methacrylate or a modified product thereof is used. Addition of such a diblock copolymer that is composed of methacrylic ester polymer blocks (hereinafter, may be shorted to MMA) and butyl acrylate polymer blocks (hereinafter, may be shorted to BA) to the above epoxy resin make it possible to provide an adhesive that has toughness, is capable of maintaining an excellent adhesive strength even in a high temperature environment, and also has an excellent water resistance. The reasons for that are not well understood but could presumably be as follow.

In the binary copolymer of MMA-BA-MMA, the MMA part is a "rigid" segment and the BA part is a "flexible" segment. In conventional adhesives, an acrylic resin has been added for the purpose of imparting toughness (flexibility) to an epoxy resin; yet the addition of the acrylic resin has decreased the heat resistance of the adhesive in itself. It is believed that with the above acrylic resin that have both "rigid" segment and "flexible" segment in combination, the "rigid" segment part contributes to the heat resistance and the "flexible" segment part contributes to the toughness or flexibility, which makes it possible to provide an adhesive that has toughness, is capable of maintaining an excellent adhesive strength even in a high temperature environment, and also has an excellent water resistance.

The above binary copolymer of MMA-BA-MMA can be produced using common living radical polymerization. Of these, it can be suitably produced by atom transfer radical polymerization from the viewpoint of ease of control of the polymerization reaction or the like. An atom transfer radical polymerization method is a polymerization method using an organic halide or a halogenated sulfonyl compound as an initiator and a metal complex as a catalyst. In cases where the binary copolymer of MMA-BA-MMA is produced by the living radical polymerization, available are for example a method comprising adding sequentially monomer units, a method comprising using a polymer that has been in advance synthesized as a polymer initiator to polymerize subsequent polymer blocks, and a method comprising linking polymer blocks by a reaction, which polymer blocks have been separately polymerized; and the binary copolymer of MMA-BA-MMA is preferably produced by a method comprising adding sequentially monomer units.

With regard to as for the order of adding methacrylic esters composed of the MMA block and a butyl acrylate composed of the BA block in the method comprising adding sequentially monomer units to produce the binary copolymer of MMA-BA-MMA, available are for example a method comprising first polymerizing methacrylic ester monomers and then adding butyl acrylate monomers and a method comprising first polymerizing butyl acrylate monomers and then adding methacrylic ester monomers; and a method comprising first polymerizing butyl acrylate monomers and polymerizing the MMA block from the terminal of polymerizing BA blocks provides easier control of the polymerization. A ratio of MMA to BA can be controlled by the amount of monomers input upon the living radical polymerization reaction. As for a ratio of the MMA block to the BA block in the binary copolymer of MMA-BA-MMA, the toughness and the flexibility of the adhesive improve when the proportion of the BA block increases whereas the heat resistance of the adhesive improves when the proportion of the MMA block increases. In the present invention, from the viewpoint of the toughness and the heat resistance of the adhesive, the ratio of the MMA block to the BA block is preferably 1:1 to 50:1 in terms of the number of the monomer units.

The above binary copolymer of MMA-BA-MMA may also be a modified product in which a carboxylic acid or a functional group such as a hydroxyl group or an amide group is introduced into part of the BA block or the MMA block. The use of such modified product further improves the heat resistance and at the same time improves the compatibility of the above epoxy resin; and thus the adhesive strength further improves, yet the water resistance is tend to decline due to the presence of the carboxylic acid or the hydrophilic functional group such as the hydroxyl group or the amide group.

When the MMA-BA-MMA binary copolymer is added to the above epoxy resin, self-assembly with the epoxy resin as a matrix takes place because the MMA block part compatibly dissolves in the epoxy resin and the BA block part does not compatibly dissolve in the epoxy resin. As a result, a sea-island structure comes out at a stage before resin curing, wherein the epoxy resin corresponds to the sea and the acrylic resin corresponds to the land. Further, in the case in which the above functional group is introduced into the MMA-BA-MMA binary copolymer, the compatibility between the epoxy resin and the acrylic resin improves and therefore the island part comes to be smaller and a seemingly compatible state is brought about. The sea-island structure and the seemingly compatible state come out as described above, thereby allowing interfacial failure to be avoided and an excellent adhesive strength to be maintained. Meanwhile, when the polarity of the acrylic resin is lowered to decrease the compatibility with the epoxy resin by using an unmodified acrylic resin into which no functional groups are introduced or the like, the sea-island structure comes out, wherein the epoxy resin and the acrylic resin are, in an opposite way to what is described above, the island and the sea, respectively; and it is therefore believed that the ability to retain the adhesive property of the adhesive sheet in a high temperature hydrothermal environment improves while the adhesive strength is maintained to a certain extent. In the case in which such a sea-island structure is present, water intrusion from the interface between adhesive (resin) and adherend can be prevented or reduced, and therefore an adhesive sheet with a more excellent water resistance can be provided.

In order to allow the above sea-island structure to come out, the epoxy resin and the acrylic resin (MMA-BA-MMA binary copolymer) are preferably mixed at a ratio by mass of 100:4 to 100:20. When both are mixed at the above ratio, the acrylic resin (the island) is dispersed in a form of fine particles of a nano-order level in the epoxy resin (the sea) at a stage before resin curing to develop a seemingly compatible state. The resin is able to maintain a more excellent adhesive strength by being cured while maintaining the seemingly compatible state.

<Curing Agent>

An adhesive composition is cured as a reaction of an acrylic resin with an epoxy resin advances by heating or the like; and in the present invention, a curing agent is included in the adhesive composition for the purpose of promoting a curing reaction. Examples of the curing agent include amine-based curing agents such as dicyandiamide (DICY) and polyamine compounds containing an organic acid dihydrazide or the like; acid anhydride-based curing agents such as alicyclic acid anhydrides (liquid acid anhydrides) such as hexahydrophthalic anhydride (HHPA) and methyltetrahydrophthalic anhydride (MTHPA); and aromatic acid anhydrides such as trimellitic anhydride (TMA), pyromellitic dianhydride (PMDA), and benzophenone tetracarboxylic acid (BTDA); phenolic curing agents such as phenol resins; and isocyanate-based curing agents such as blocked isocyanates; in addition to aliphatic polyamines such as diethylenetriamine (DETA), triethylenetetramine (TETA), and m-xylylenediamine (MXDA); aromatic polyamines such as diaminodiphenylmethane (DDM), m-phenylenediamine (MPDA), and diaminodiphenyl sulfone (DDS). Of these, an amine-based curing agent can be suitably used and in particular a dicyandiamide-based curing agent is preferred.

In cases where the dicyandiamide-based curing agent is used as a curing agent, a blocked isocyanate is preferably used in combination. The combined use of the dicyandiamide with the blocked isocyanate improves the storage stability of the adhesive. In addition, the combined use of the cyanate-based curing agent leads to, in the case in which a hydroxyl group is present on the surface of the adherend as is the case for metals, the formation of crosslink between the hydroxyl group and an adhesive component, which therefore improves the surface adhesion force.

The blocked isocyanate is a reaction product obtained by subjecting an isocyanate group of an isocyanate compound to an addition reaction with a blocking agent. Accordingly, the blocked isocyanate is one in which the isocyanate group is protected with the blocking agent and inactivated. This blocked isocyanate is subjected to heat treatment at a predetermined temperature and thereby the blocking agent dissociates from the isocyanate group, that is, performs deblocking, to regenerate an active isocyanate group.

Examples of the isocyanate compound include isocyanates having two or more isocyanate groups in one molecule. Specific examples include aliphatic isocyanates such as tetramethylene diisocyanate, hexamethylene diisocyanate, 1,3,6-hexamethylene triisocyanate, isophorone diisocyanate, and 4,4'-dicyclohexylmethane diisocyanate; aromatic isocyanates such as 4,4'-diphenylmethane diisocyanate, 2,4-tolylene diisocyanate, 2,6-tolylene diisocyanate, xylylene diisocyanate, 1,5-naphthalene diisocyanate, and 4,4-diphenyl diisocyanate; and alicyclic isocyanates such as dicycloheptane triisocyanate.

Further, examples of the blocking agent include active methylene-based blocking agents such as ethyl acetoacetate; phenolic blocking agents such as phenol, cresol, and xylenol; pyrazole-based blocking agents such as dimethylpyrazole; alcohol-based blocking agents such as methanol, ethanol, diethyl malonate, methyl lactate, and ethyl lactate; oxime-based blocking agents such as methyl ethyl ketoneoxime, diacetyl mono oxime, and cyclohexane oxime; mercaptan-based blocking agents such as butyl mercaptan, t-butyl mercaptan, and thiophenol; imide-based blocking agents such as succinimide; amine-based blocking agents such as aniline and butylamine; imidazole-based blocking agents such as imidazole and 2-ethylimidazole; and imine-based blocking agents such as methyleneimine and propyleneimine.

As the above blocked isocyanate, ones that are commercially available may be used; and examples thereof include MF-K60B, SBN-70D, TPA-B80E, 17B-60PX, E402-B80B, and E402-B80T (all of which are manufactured by Asahi Kasei Chemicals Corp.).

As for the content of the curing agent in the adhesive composition, 5 to 30 parts by mass of the curing agent are preferably contained in 100 parts by mass of the epoxy resin and the epoxy modified silicone resin. By setting a mix ratio of the curing agent in the above range, in cases where an adhesive sheet is stored until bonded to an adherend, the storage stability (pot life) can be maintained during that storage period. At the same time, the heat resistance after bonding further improves and a high adhesive strength can be maintained regardless of changes in temperature change. In addition, if the mix ratio of the curing agent falls in the above range, no curing agents remain unreacted even after the adhesive is cured and therefore the adhesive force does not decrease.

<Other Component>

For the purpose of improving and properly modifying, for example, processability, heat resistance, weather resistance, mechanical property, dimension stability, antioxidant, slidability, mold releasability, flame retardance, antifungal property, electric characteristic, strength, or the like, a lubricant, a plasticizer, a bulking agent, a filler, an antistatic agent, an antiblocking agent, a cross-linker, an antioxidant, an ultraviolet absorbent, a light stabilizer, a coloring agent such as a dye and a pigment may for example be added, as needed, to the adhesive composition according to the present invention. In addition, a silane-based coupling agent, a titanium-based coupling agent, an aluminum-based coupling agent, or the like can be further included as needed. This can improve the adhesion between the resin and the adherend and between the resin and a core material described later.

As for the adhesive composition, each of the above components can be mixed, kneaded as needed, and dispersed to prepare the adhesive. A method of mixing or dispersing is not particularly restricted; and a common dispersion kneader including for example a twin roll mill, a triple roll mill, a pebble mill, a trom mill, a Szegvari attritor, a high speed impeller disperser, a high speed stone mill, a high speed impact mill, a desuper, a high speed mixer, a ribbon blender, a co-kneader, an intensive mixer, a tumbler, a blender, a disperser, a homogenizer, and a ultrasonic disperser is applicable. In cases where two or more kinds of rigid epoxy resins are used, it is preferred that these resins be mixed and stirred in advance, then mixed and stirred with a curing agent, diluted in a solvent, thereafter mixed and stirred with a soft epoxy resin, and subsequently mixed and stirred with an acrylic resin.

<Adhesion Sheet>

Figure 2:
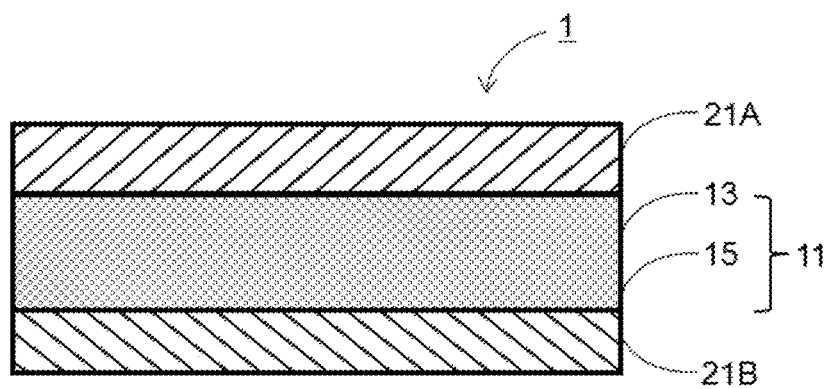
FIG. 2 is a cross-section schematic view of other embodiment of the adhesive sheet according to the present invention.

The adhesive sheet according to the present invention, as shown in FIG. 1, has a layer composition arranging the first release paper and the second release paper on both sides of the adhesive layer composed of the above adhesive composition. It is to be noted that the first release paper 21A and the second release paper 21B are combined to be referred to as the release paper 21 in the present specification. As shown in FIG. 2, the adhesive layer further contains a core material and the adhesive may be impregnated into the core material. As the core material, woven fabrics or non-woven fabrics are preferred; and a variety of conventionally-known woven fabrics or non-woven fabrics can be used. Examples include plastic fibers with heat resistance such as liquid crystal polymers, glass fibers, aramid fibers, and carbon fibers; and woven fabrics or non-woven fabrics composed of those can be used.

In cases where the adhesive layer contains the core material, the first release paper 21 described later and the core material 15 are laid one on top of another and fed to be applied the above adhesive 13 composition on the surface of the core material 15 using a coater. The composition is thereby impregnated into the core material 15 and dried, and thereafter the second release paper 21B is pasted on the coated surface to obtain adhesive sheet 1.

A method of applying the adhesive composition to the release paper is not particularly restricted; and roll coating, reverse roll coating, transfer roll coating, gravure coating, gravure reverse coating, comma coating, rod coating, blade coating, bar coating, wire bar coating, die coating, lip coating, dip coating, and the like can be applicable. What is simply required is that the composition is applied, by the above coating method, onto the release surface of the first release paper 21A or onto the surface of the core material 15 while the first release paper 21A and the core material 15 are laid one on top of another and dried; and then, to the resultant, the second release paper 21B is pasted. The viscosity of the composition (the liquid applied) is adjusted to about 1 to 20000 centi stokes (at 25° C.) and preferably 1 to 2000 centi stokes. In cases where the composition is impregnated into and applied onto the core material 15, the viscosity is preferably lower and 1 to 1000 centi stokes.

The first release paper 21A and the second release paper 21B, which are used herein, may be the same ones or different ones and be used. As the release paper 21, ones that are conventionally known can be suitably used; and examples thereof include release films, separator paper, separator films, separator paper, peel films, and release paper. Further, ones obtained by forming a release layer on one side or both sides of a substrate for release paper such as wood-free paper, coated paper, impregnated paper, and plastic films may also be used. The release layer is not particularly restricted as long as it is a material that has the mold releasability; and examples thereof include silicone resins, organic resin modified silicone resins, fluorine resins, amino alkyd resins, melamine-based resins, acrylic-based resins, and polyester resins. As for these resins, any of emulsion-type, solvent-type or solventless-type can be used.

The release layer is formed by applying a coating liquid obtained by dispersing and/or dissolving a release layer component onto one side of a substrate film for release paper followed by heating drying and/or curing. As for a method of applying the coating liquid, any known coating method can be applicable; and examples thereof include roll coating, gravure coating, and spray coating. In addition, the release layer may also be formed as needed on the entire surface or part of at least one side of the substrate film.

The peeling force of the first and second release paper is about 1 to 2000 mN/cm and further preferably 100 to 1000 mN/cm to the adhesive sheet. By setting the peeling force of the release layer in the above range, the peeling force to the adhesive sheet and adherend materials can be ensured to avoid peeling and partial incoherence and at the same time a stable mold releasability is ensured. From the viewpoint of the stable mold releasability and processability, preferred is an addition polymerization-type and/or polycondensation-type cured silicone resin for release paper with polydimethylsiloxane as a major component.

<Method of Adhering Adherend>

As for bonding to an adherend, the first release paper 21A and the second release paper 21B of the adhesive sheet 1 are peeled off and removed to expose the adhesive layer 11. The exposed adhesive layer 11 is placed between the first adherend and the second adherend, two of which are same or different, to be held with the adhesiveness of the adhesive layer 11. Subsequently, the adhesive layer 11 is cured by heating or heating with applied pressure, which enables the first adherend and the second adherend to be solidly adhered. As just described above, the use of the adhesive sheet according to the present invention makes it possible to temporarily fix the adherends by making use of the initial adhesiveness and thereafter thermally cure the adhesive sheet by for example a batch method to adhere to the adherend, which enables the step such as preheating to be cut out and significantly improves the productivity.

The adherend is not particularly restricted; and examples thereof include metals, inorganic materials, and organic materials, and composite materials, and laminated materials obtained by combining those.

The heating temperature at the time of curing is about 60° C. to 250° C. and preferably 100° C. to 180° C. The heating time is 1 to 240 minutes and preferably 10 to 120 minutes. The adhesive layer 11 of the cured adhesive sheet 1 have the initial adhesiveness, does not require the step such as preheating, and can be handled while the adherend is held with adhesive strength alone, thereby resulting in better ease of handling and lower cost. In addition, the selection of materials of the adhesive layer and a mix ratio thereof allows for metal-to-metal adhesion, metal-to-organic material adhesion, and organic material-to-organic material adhesion. Further, a strong adhesive strength attributed to the epoxy resin is attained and this adhesive strength is hard to deteriorate even upon changes in temperature. In addition, the brittleness is low because of the acrylic resin; and an excellent shear strength, a high shock resistance, and a high heat resistance are achieved, which allows for use in structure applications.

<Laminated Product>

The use of the adhesive sheet according to the present invention allows for strong bonding between materials (adherends) that are hard to be bonded by a conventional welding method such as FRP of glass fibers or carbon fibers, and different kinds of metals to obtain, for example, a laminated product between aluminum and a metal such as iron and a laminated product between FRPs or between CFRPs. These laminated products can maintain an excellent adhesive strength without being affected by changes in temperature and at the same time exhibits a low brittleness, an excellent shear strength, a high shock resistance, and heat resistance; and can therefore be used not only in the field such as automobiles, aircrafts, and ship, but also in the field such as electronic equipment, electronic equipment housings, home appliance products, infrastructure-related structures, essential utilities building material, and general-purpose building materials.

EXAMPLES

The present invention is described below in more detail by way of Examples. However, the present invention is not limited to the contents of these Examples. The amount of each composition in each layer is represented by parts by mass of the solid content excluding the solvent.

Examples 1 to 20 and Comparative Examples 1 to 8

<Preparation of Adhesive Composition>

According to the composition shown in Table 1 and Table 2 below, an epoxy resin, a silicone resin, a silane coupling agent, and a curing agent or a curing accelerator were each added and mixed by a stirrer; and thereafter an acrylic resin was added to the mixture, thereby preparing an adhesive. It is to be noted that each of the followings in the tables below represents as follows:

JER828 and JER1001 represent bisphenol A epoxy resins manufactured by Mitsubishi Chemical Corporation;

2021P represents an alicyclic bifunctional epoxy resin (Celloxide) from Daicel Corporation;

YH-300 represents an aliphatic glycidylether from Nippon steel & Sumikin Chemical Co., Ltd.;

ES1023 represents an epoxy modified silicone resin from Shin-Etsu Chemical Co., Ltd.;

TSR960 represents a rubber modified epoxy resin from DIC Corporation;

M22N represents a modified binary copolymer of methyl methacrylate-butyl acrylate-methyl methacrylate with an amide-based polar group being introduced, which binary copolymer is manufactured by Arkema;

SM4032XM10 represents a modified binary copolymer of methyl methacrylate-butyl acrylate-methyl methacrylate with a carboxyl group being introduced, which binary copolymer is manufactured by Arkema;

M22 represents a binary copolymer of methyl methacrylate-butyl acrylate-methyl methacrylate manufactured by Arkema;

KBM-403 and KBM-803 represent silane coupling agents manufactured by Shin-Etsu Silicones;

DICY7 represents a dicyandiamide manufactured by Mitsubishi Chemical Corporation;

HIPA-2E4MZ represents an inclusion imidazole manufactured by Nippon Soda Co., Ltd.; and MF-K60B and SBN-70D represent blocked isocyanates manufactured by Asahi Kasei Corporation.

TABLE 1

| Adhesive composition | | Example 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| Bisphenol bifunctional epoxy resin | JER828 (liquid) | 65 | 65 | 65 | 65 | 65 | 65 | 65 | 65 | 65 | 65 | 65 | 65 | 65 | 65 | 65 |
| | JER1001 (solid, Tg = 64° C.) | 10 | 50 | 10 | 50 | 50 | 50 | 50 | 50 | 50 | 50 | 50 | 50 | 50 | 50 | 50 |
| Alicyclic/aliphatic bifunctional epoxy resin | 2021P | — | — | — | — | — | — | — | — | — | — | — | — | — | — | — |
| | YH-300 | — | — | — | — | — | — | — | — | — | — | — | — | — | — | — |
| Polyfunctional epoxy resin | JER604 | 65 | 65 | 65 | 65 | 65 | 65 | 65 | 65 | 65 | 65 | 65 | 65 | 65 | 65 | 65 |
| Epoxy modified silicone resin | ES1023 | 60 | 20 | 60 | 20 | 20 | 20 | 20 | 20 | 20 | 20 | 20 | 20 | 20 | 20 | 20 |
| Rubber modified bifunctional epoxy resin | TSR960 | — | — | — | — | — | — | — | — | — | — | — | — | — | — | — |
| Acrylic resin | M22N (modified PMMA-BA-PMMA) | 30 | 30 | 30 | 30 | 30 | 30 | 30 | 30 | 30 | 30 | 30 | 30 | 30 | — | — |
| | SM4032XM10 (modified PMMA-BA-PMMA) | — | — | — | — | — | — | — | — | — | — | — | — | — | 30 | — |
| | M22 (PMMA-BA-PMMA) | — | — | — | — | — | — | — | — | — | — | — | — | — | — | 30 |
| Silane coupling agent | KBM-403 | — | — | 2 | 2 | — | 1 | 6 | 2 | 2 | 2 | 2 | 2 | 2 | 2 | 2 |
| | KBM-803 | — | — | — | — | 2 | — | — | — | — | — | — | — | — | — | — |
| Curing agent/curing accelerator | DICY7 (dicyandiamide) | 14 | 14 | 14 | 14 | 14 | 14 | 14 | 14 | 14 | 14 | 14 | 14 | 14 | 14 | 14 |
| | HIPA-2E4MZ (imidazole) | 9 | 9 | 9 | 9 | 9 | 9 | 9 | 9 | 9 | 9 | 9 | 9 | 9 | 9 | 9 |
| | MF-K60B (blocked isocyanate) | — | — | — | — | — | — | — | 0.5 | 2 | 10 | — | — | — | — | — |
| | SBN-70D (blocked isocyanate) | — | — | — | — | — | — | — | — | — | — | 0.5 | 2 | 10 | — | — |

TABLE 2

| Adhesive composition | | Comparative Example 1 | 2 | 3 | 4 | 5 | 6 | 7 | 8 |
|---|---|---|---|---|---|---|---|---|---|
| Bisphenol bifunctional epoxy resin | JER828 (liquid) | 200 | 150 | — | — | 65 | 85 | 65 | 30 |
| | JER1001 (solid, Tg = 64° C.) | — | 50 | 50 | 50 | 50 | 50 | 50 | 170 |
| Alicyclic/aliphatic bifunctional epoxy resin | 2021P | — | — | 65 | — | — | — | — | — |
| | YH-300 | — | — | — | 65 | — | — | — | — |
| Polyfunctional epoxy resin | JER604 | — | — | 65 | 65 | 65 | 65 | 65 | — |
| Epoxy modified silicone resin | ES1023 | — | 20 | 20 | 20 | — | — | 20 | — |
| Rubber modified bifunctional epoxy resin | TSR960 | — | — | — | — | 20 | — | — | — |
| Acrylic resin | M22N (modified PMMA-BA-PMMA) | — | 30 | 30 | 30 | — | — | — | 30 |
| | SM4032XM10 (modified PMMA-BA-PMMA) | — | — | — | — | 30 | 30 | — | — |
| | M22 (PMMA-BA-PMMA) | — | — | — | — | — | — | — | — |
| Silane coupling agent | KBM-403 | — | — | — | — | 2 | 2 | 2 | — |
| | KBM-803 | — | — | — | — | — | — | — | — |
| Curing agent/curing accelerator | DICY7 (dicyandiamide) | 14 | — | — | — | 14 | 14 | 14 | 14 |
| | HIPA-2E4MZ (imidazole) | 9 | — | — | — | 9 | 9 | 9 | 9 |
| | MF-K60B (blocked isocyanate) | — | — | — | — | — | — | — | — |
| | SBN-70D (blocked isocyanate) | — | — | — | — | — | — | — | — |

<Preparation of Adhesive Sheet>

Each obtained adhesive was applied to the surface of a core (VECRUS MBBK6FZSO) laminated on a sepa film (SP-PET 03BU, manufactured by Tohcello Co., Ltd.), using a comma coater such that the amount of application was 100 g/m², to allow impregnation of the core with the adhesive, thereby forming an adhesive layer. By laminating a sepa film (SP-PET 01BU, manufactured by Tohcello Co., Ltd.) on the adhesive layer, an adhesive sheet was prepared.

<Preparation of Laminated Product>

The obtained adhesive sheet was cut into a piece of 25 mm×12.5 mm, and one of the sepa films was peeled off to expose the adhesive layer, followed by attaching the adhesive layer to a tip portion of a CFRP adherend (length, 100 mm; width, 25 mm; thickness, 1.5 mm). From the adhesive sheet attached to the CFRP, the sepa film was peeled off to expose the adhesive layer. To the adhesive layer portion, a tip portion of another CFRP adherend (length, 100 mm; width, 25 mm; thickness, 1.5 mm) was attached.

Subsequently, a load of 3 kg was applied on the temporarily fixed adherend, and heat curing was carried out at 130° C. for 2 hours, to obtain a laminated body.

<Evaluation of Adhesive Strength>
(1) Initial Adhesive Strength

With regard to each of the obtained laminated products, both ends of the obtained laminated product were set in place on Tensilon (RTF1350, manufactured by A&D Company, Limited) in an environment of 23° C. and 50% RH to measure tensile strength and shear strength at 10 mm/min. The result of the evaluation is as shown in Table 3 below.

(2) Adhesive Strength after Storage in a High Temperature Hydrothermal Environment Each of the obtained laminated product was immersed in distilled water and left to stand in an environment of 80° C. for 200 hours; and thereafter the resulting laminated product was taken out of the distilled water and left to stand in an environment of 23° C. and 50% RH for 24 hours. Subsequently, the shear strength was measured in the same manner as described above. Further, a retention rate of the adhesive strength after storage in a high temperature hydrothermal environment based on the initial adhesive strength was calculated as follows: Adhesive strength after storage in a high temperature hydrothermal environment (Mpa)/Initial adhesive strength (Mpa)×100(%). The result of the evaluation is as shown in Table 3 below.

<Evaluation of Film-Forming Properties>

To a sepa film (SP-PET 01BU, manufactured by Tohcello Co., Ltd.), each adhesive was applied using a comma coater such that the amount of application after drying was 50 g/m$^2$, and drying was carried out at 100° C. for 3 minutes, followed by observation of the external appearance of the coated surface. The evaluation criteria were as follows:

O: The coated film has a uniform thickness (±5 μm);

X: There are some spots where the adhesive was repelled and was not coated in the surface of the separator film.

The result of the evaluation is as shown in Table 3 below.

<Evaluation of Storage Stability>

One of the separator films was peeled off from each of the adhesive sheets from Examples and Comparative Examples to expose an adhesive layer and, on the adhesive layer part, an aluminum plate (6061) whose surface had been washed was placed; and over the resultant, a manual compression bonding apparatus (JIS0237) was adopted at a rate of compression bonding of about 5 mm/sec and allowed to travel back and forth once to paste the adhesive sheet together with the aluminum plate, thereby obtaining a test sample. Subsequently, the obtained test sample was subjected to the measurement of peel strength (N/cm) using Tensilon (RTA-1T manufactured by Orientec Corporation) at 180° and 300 mm/min.

In addition each of the adhesive sheets from Examples and Comparative Examples was left to stand in an environment of 23° C. and 50% RH for one month; and then a test sample was prepared in the same manner as described above and subjected to peel strength measurement. Ones that have 50% or more of the initial adhesiveness based on the initial adhesive strength after the preparation of the test sample were considered to have tack (O). The result of the evaluation is as shown in Table 3 below.

TABLE 3

| | Adhesion strength/Adhesive strength (MPa) | | | | |
| --- | --- | --- | --- | --- | --- |
| | Initial | After hydrothermal treatment | Retention rate (%) | Film-forming properties | Storage stability |
| Example 1 | 25 | 18 | 72 | o | o |
| Example 2 | 24 | 19 | 79 | o | o |
| Example 3 | 24 | 23 | 96 | o | o |
| Example 4 | 24 | 23 | 96 | o | o |
| Example 5 | 24 | 21 | 88 | o | o |
| Example 6 | 25 | 24 | 96 | o | o |
| Example 7 | 25 | 23 | 92 | o | o |
| Example 8 | 31 | 31 | 100 | o | o |
| Example 9 | 30 | 31 | 103 | o | o |
| Example 10 | 29 | 30 | 103 | o | o |
| Example 11 | 32 | 32 | 100 | o | o |
| Example 12 | 31 | 30 | 97 | o | o |
| Example 13 | 29 | 29 | 100 | o | o |
| Example 14 | 27 | 23 | 85 | o | o |
| Example 15 | 14 | 13 | 93 | o | o |
| Comparative Example 1 | 22 | 11 | 50 | x | o |
| Comparative Example 2 | 23 | 14 | 61 | o | o |
| Comparative Example 3 | 12 | 6 | 50 | o | o |
| Comparative Example 4 | 15 | 10 | 67 | o | o |
| Comparative Example 5 | 19 | 10 | 53 | o | o |
| Comparative Example 6 | 22 | 15 | 68 | o | o |
| Comparative Example 7 | 20 | 12 | 60 | x | o |
| Comparative Example 8 | 29 | 17 | 59 | o | o |

<Observation of Adhesive's Compatible State>

Figure 3:
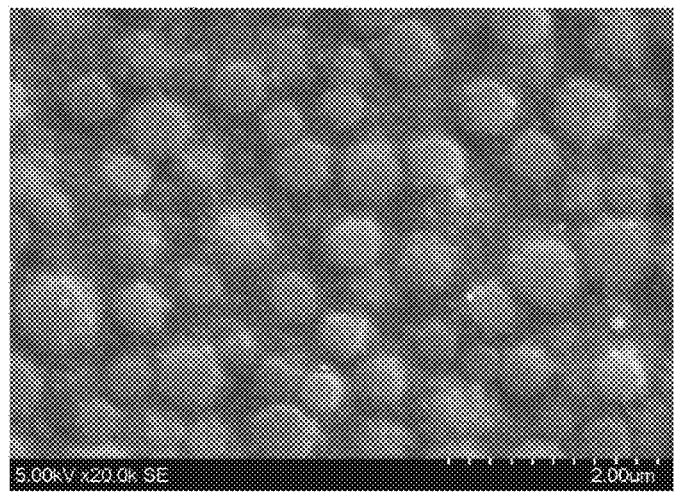
FIG. 3 is a photograph from surface observation of the adhesive from Example 1.
Figure 4:
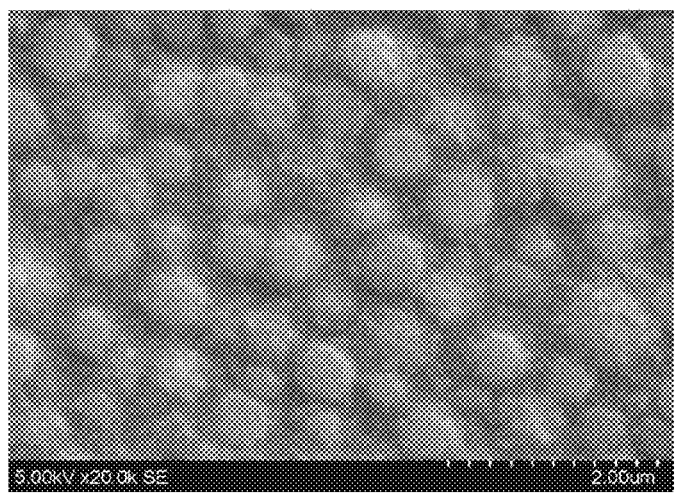
FIG. 4 is a photograph from surface observation of the adhesive from Example 2.
Figure 5:
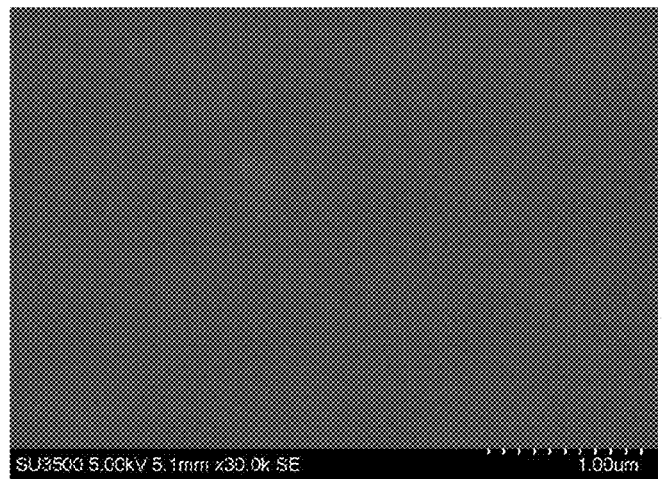
FIG. 5 is a photograph from surface observation of the adhesive from Comparative Example 1.

The adhesive sheet from Example 1, Example 2, and Comparative Example 1 was cured at 130° C. for two hours; and thereafter one of the separator films was peeled off to expose an adhesive layer and subjected to surface observation using an electron microscope (SU3500, manufactured by Hitachi High-Technologies Corporation) to check the compatible state of the adhesive. The obtained electron micrographs are as shown in FIG. 3 to FIG. 5. As shown in FIGS. 3 and 4, it was observed that a sea-island structure came out for the adhesives from the Examples. In addition, it was able to be confirmed that the island part was in a mixed state of larger islands and smaller ones. Without wishing to be bound by a theory, it is believed that the part corresponding to the sea is the epoxy resin; the larger island is a cross-linked epoxy resin; and the smaller island is the acrylic resin. On the other hand, it was observed that the adhesive from the Comparative Examples is compatibly dissolved in a uniform fashion and the sea-island structure did not come out.

<Dynamic Viscoelasticity Measurement>

Figure 6:
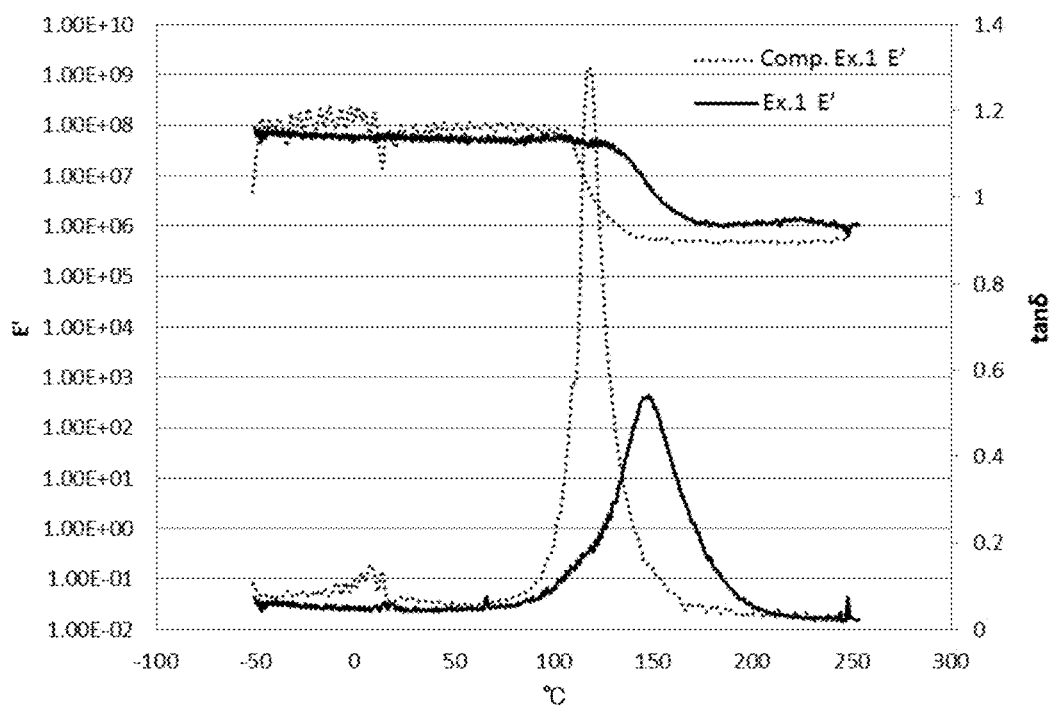
FIG. 6 is a graph showing the temperature dependence of the storage modulus (E') and the loss tangent (tan δ) of the adhesive from Example 1 and Comparative Example 1.

Each of the adhesive sheets from Example 1 and Comparative Example 1 was cured at 130° C. for two hours and then separator films on both sides were peeled off, thereby obtaining an adhesive. The storage modulus (E') and loss tangent (tan δ) of this adhesive were measured at 25° C. using a solids dynamic mechanical analyzer RSA-III manufactured by TA Instruments by a dynamic viscoelasticity measurement method in accordance with JIS K7244-1 (attachment mode: compression mode, frequency: 1 Hz, temperature: −50 to 150° C., rate of temperature increase: 5° C./min). The result of the evaluation is as shown in FIG. 6. As is clear from a profile of the temperature dependence of E' and tan δ shown in FIG. 6, the adhesive from the Example has a higher softening point than the adhesive from Comparative Example 1. From the above results, it can be seen that the adhesive composition according to the present invention is also able to maintain an excellent adhesive strength even in a high temperature hydrothermal environment.

Figure 7:
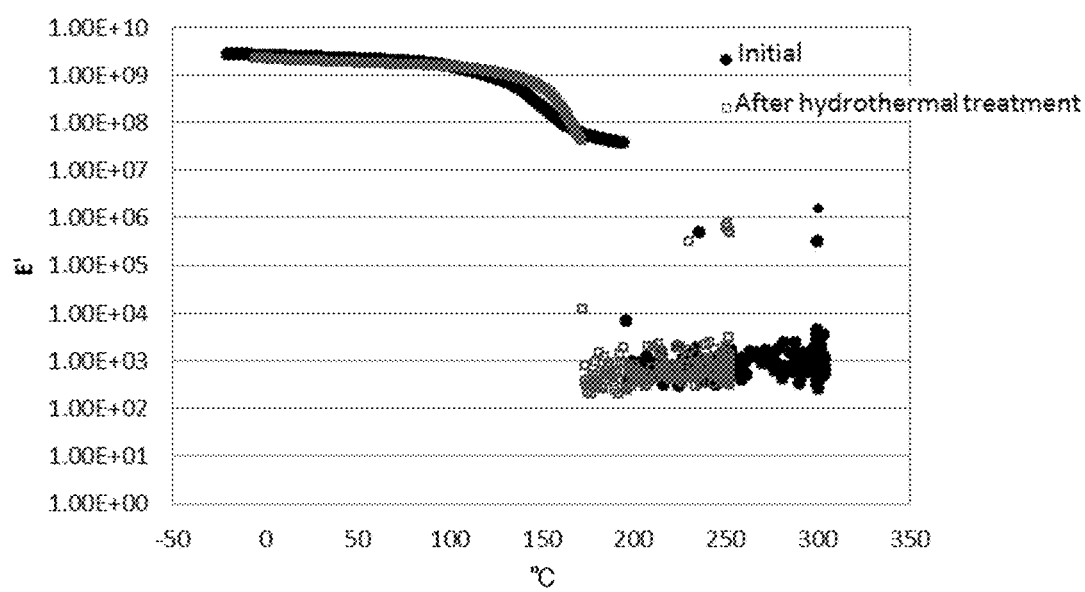
FIG. 7 is a graph showing the temperature dependence of the storage modulus (E') of the adhesive from Example 2.
Figure 8:
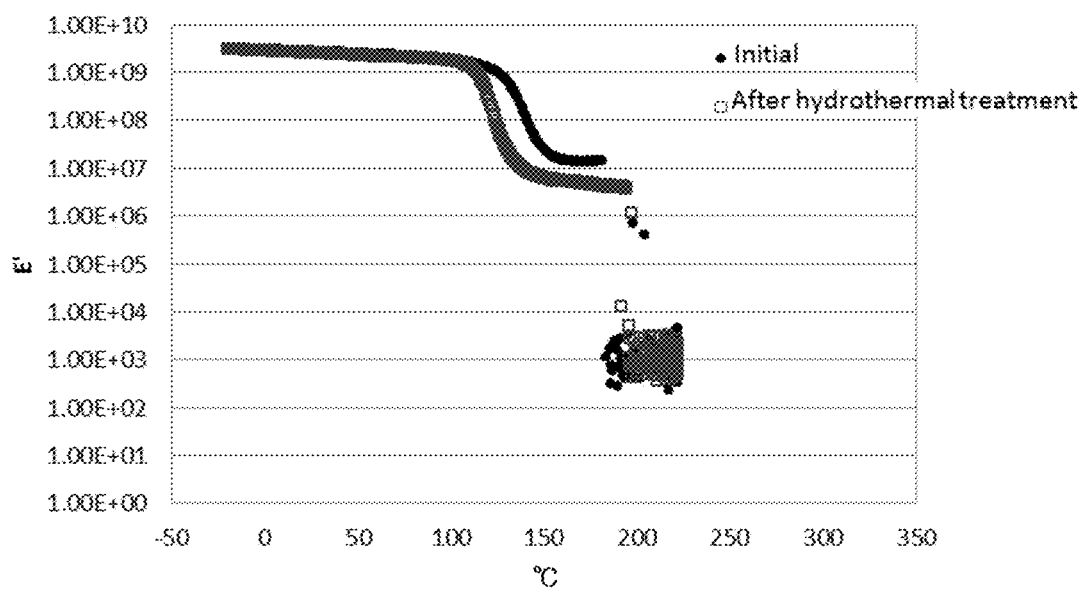
FIG. 8 is a graph showing the temperature dependence of the storage modulus (E') of the adhesive from Comparative Example 8.
Figure 9:
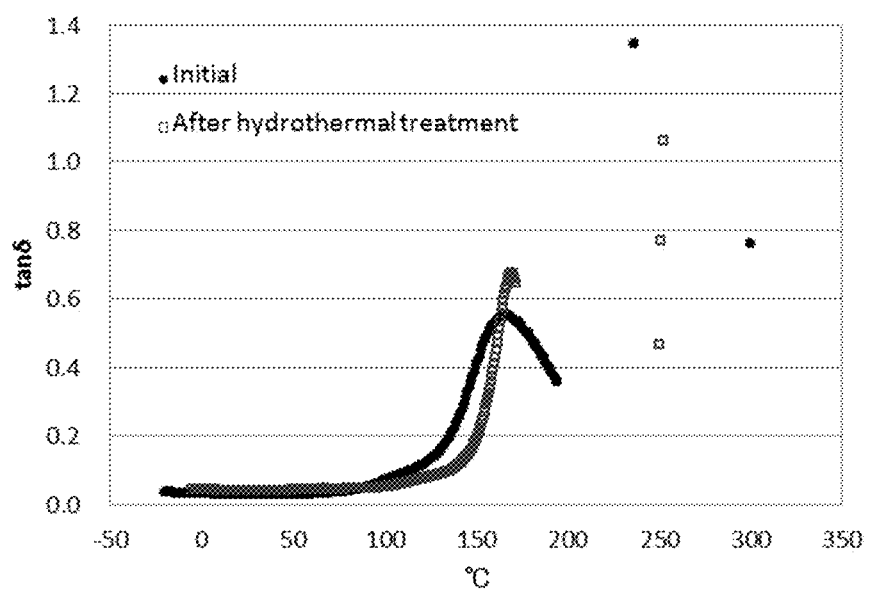
FIG. 9 is a graph showing the temperature dependence of the loss tangent (tan δ) of the adhesive from Example 2.
Figure 10:
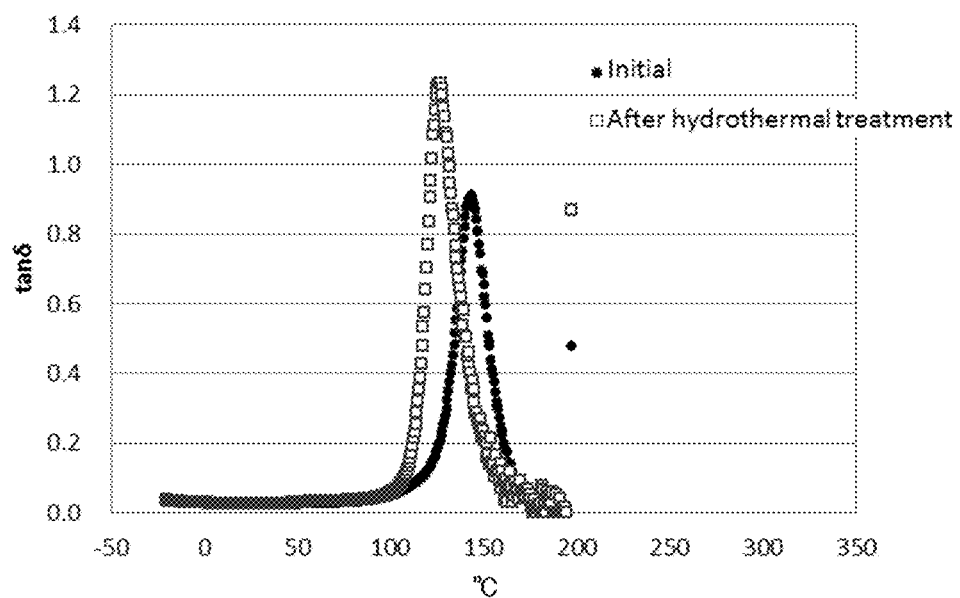
FIG. 10 is a graph showing the temperature dependence of the loss tangent (tan δ) of the adhesive from Comparative Example 8.

Further, each of the adhesive sheets from Example 2 and Comparative Example 8 was cured at 130° C. for two hours and then the separator films on both sides were peeled off, thereby obtaining an adhesive. The cured adhesive was subjected to hydrothermal treatment by being immersed at 80° C. in hot water and left to stand for 200 hours. The storage modulus (E') and loss tangent (tan δ) of the adhesive were measured at 25° C. before and after the hydrothermal treatment in the same manner as described above. The results are as shown in FIG. 7 and FIG. 8 (Example 2) as well as in FIG. 9 and FIG. 10 (Comparative Example 8). It can be seen that, judging from the measurement results of E and tan δ, the glass transition temperature of the adhesive shifts to a lower temperature side after the hydrothermal treatment in Comparative Example 8 whereas the glass transition temperature does not decrease after the hydrothermal treatment and rather, albeit slightly, increases by adding thermal history at 80° C. in Example 2. These measurement results suggest that the cohesive force of the adhesive sheet from the Example does not decrease and its water resistance improves even in a hydrothermal environment.

DESCRIPTION OF SYMBOLS

1: Adhesive sheet
11: Adhesive layer
13: Adhesive
15: Core material
21: Release paper
21A: First release paper
21B: Second release paper

The invention claimed is:

1. An adhesive composition comprising:
   an epoxy resin comprising a bisphenol bifunctional epoxy resin and an epoxy resin with trifunctionality or higher functionality,
   an epoxy modified silicone resin that is a resin obtained by introducing an epoxy group into a silicone resin, the silicone resin being a compound having a polyorganosiloxane backbone,
   an acrylic resin comprising a binary copolymer of methyl methacrylate-butyl acrylate-methyl methacrylate or a modified product thereof, and
   a curing agent.

2. The adhesive composition according to claim 1, wherein the bisphenol bifunctional epoxy resin comprises two kinds of bisphenol epoxy resins: a bisphenol type epoxy resin which is in a liquid state at normal temperature and a bisphenol type epoxy resin whose glass transition temperature is within the range of 50 to 150° C. and which is in a solid state at normal temperature.

3. The adhesive composition according to claim 1, wherein the epoxy resin with trifunctionality or higher functionality is a tetrafunctional epoxy resin with a bis (aminophenyl)methane backbone.

4. The adhesive composition according to claim 1, further comprising a silane coupling agent.

5. The adhesive composition according to claim 1, wherein the curing agent is a dicyandiamide-based curing agent.

6. The adhesive composition according to claim 5, wherein the curing agent comprises a dicyanamide-based curing agent and a cyanate-based curing agent.

7. The adhesive composition according to claim 1, comprising the bisphenol bifunctional epoxy resin and the epoxy resin with trifunctionality or higher functionality at a ratio of 75:65 to 115:65 by mass.

8. The adhesive composition according to claim 1, comprising 58.3 to 86.5 parts by mass of the epoxy resin, 8.3 to 28.8 parts by mass of the epoxy modified silicone resin, and 3.9 to 16.6 parts by mass of the acrylic resin.

9. An adhesive sheet comprising a first release paper, an adhesive layer, and a second release paper laminated in this order, the adhesive layer comprising the adhesive composition according to claim 1.

10. The adhesive sheet according to claim 9, wherein the adhesive layer further comprises a core material and the adhesive is impregnated into the core material.

11. A method of adhering a first adherend to a second adherend using the adhesive sheet according to claim 9, the method comprising:
   peeling off and removing the first release paper and the second release paper from the adhesive sheet to expose the adhesive layer;
   placing the adhesive layer between the first adherend and the second adherend to temporarily fix the first adherend to the second adherend; and
   curing the adhesive layer by heating to adhere the first adherend to the second adherend.

12. A laminated product obtained by the method according to claim 11.

* * * * *